United States Patent [19]
Ito et al.

[11] Patent Number: 4,814,928
[45] Date of Patent: Mar. 21, 1989

[54] INFORMATION RECORDING DISK PROVIDED WITH DISTINGUISHING MARK

[75] Inventors: Hisashi Ito, Kawasaki; Tomiya Sonoda, Tokyo, both of Japan

[73] Assignee: Kabushiki Kaisha Toshiba, Kawasaki, Japan

[21] Appl. No.: 81,538

[22] Filed: Aug. 4, 1987

Related U.S. Application Data

[63] Continuation of Ser. No. 724,918, Apr. 19, 1985, abandoned.

[30] Foreign Application Priority Data

May 30, 1984 [JP] Japan ................... 59-110243

[51] Int. Cl.$^4$ .................... G11B 5/00; G11B 5/82; G11B 5/718
[52] U.S. Cl. ...................... 360/135; 360/137; 428/694
[58] Field of Search ............. 360/135, 137; 428/694, 428/900

[56] References Cited

U.S. PATENT DOCUMENTS

| | | | |
|---|---|---|---|
| 3,593,331 | 7/1971 | Connell | 360/135 |
| 3,932,895 | 1/1976 | Ward | 360/135 |
| 4,060,839 | 11/1977 | Meadows | 360/135 X |
| 4,649,073 | 3/1987 | Suzuki et al. | 428/457 X |
| 4,652,479 | 3/1987 | Suzuki et al. | 428/694 X |

Primary Examiner—Stuart N. Hecker
Assistant Examiner—Alyssa H. Bowler
Attorney, Agent, or Firm—Oblon, Fisher, Spivak, McClelland & Maier

[57] ABSTRACT

An information recording disk comprising a disk-like substrate and magnetic layers formed on both surfaces of the substrate is provided with a mark punched through the disk. The mark is provided by, for example, a hole positioned apart from a reference line passing through both the center of an index hole for specifying the circumferential position of the disk and the center of the disk. If the disk is rotated by 180° about the reference line, the position of the mark is reversed with respect to the reference line, making it possible to distinguish the front and back surfaces of the disk. The magnetic layers formed on both surfaces of the substrate by means of, for example, sputtering, differ from each other in magnetic properties. To determine the magnetic layer used for the information recording-reproduction or to determine the optimum conditions for the recording-reproduction, it is necessary to distinguish the front and back surfaces of the disk. The mark provided in the disk of the present invention permits visually distinguish the front and back surfaces of the disk easily in the step of loading the disk in a package. Also, the mark can be provided in the punching step of a tape having magnetic layers formed on both surfaces thereof in a disk-like shape, thereby eliminating confusion in the later step.

20 Claims, 8 Drawing Sheets

INFORMATION RECORDING DISK PROVIDED WITH DISTINGUISHING MARK

This application is a continuation of application Ser. No. 724,918, filed on Apr. 19, 1985, now abandoned.

BACKGROUND OF THE INVENTION

This invention relates to an information recording disk comprising a disk-like substrate and recording layers formed on both surfaces of the substrate.

Recently, a vertical magnetization recording system utilizing a residual magnetism in a direction perpendicular to the main surface of a magnetic recording medium attracts attentions in this field. In this system, the magnetism is unlikely to be attenuated by the adjacent magnetic field, making it possible to perform a high density recording. A typical magnetic recording medium for the perpendicular magnetic recording, hereinafter referred as the perpendicular magnetic recording medium, consists of a substrate and a Co-Cr series thin film formed on the substrate. The thin film has a magnetizable axis in its thickness direction and acts as a magnetic recording layer. Also, the substrate is formed of a polymer film such as a heat-resistant film consisting of polyimide or a polyethyleneterephthalate film. The perpendicular magnetic recording medium is prepared by forming the thin films on both surfaces of the substrate by means of sputtering, and used in general as a floppy disk. When used as a floppy disk, the substrate is of a disk shape.

The Co-Cr series thin films are formed on both surfaces of the substrate as mentioned above. If the thin film is formed on only one surface by sputtering, the substrate is markedly curled such that the central portion of the substrate projects toward the film-formed side. If the thin films are formed on both surfaces, however, the curling generated in the step of forming a first thin film is substantially corrected in the step of forming a second thin film, with the result that the produced recording medium is substantially free from the curling.

The curling may be completely eliminated theoretically, if the thin films are formed under the same sputtering conditions and have the same thickness. However, it is practically impossible to completely eliminate the curling, even if the Co-Cr series thin films are formed on both surfaces under the same sputtering conditions and in the same thickness. This is because the substrate in the second sputtering step, i.e., the substrate having a first thin film formed thereon, differs from the single substrate in properties such as the effective thermal expansion coefficient and Young's modulus. To overcome the problem, it may be necessary to make the first and second thin films different from each other in thermal expansion coefficient and mechanical properties by changing the thickness, sputtering conditions and composition of the first and second magnetic thin films.

However, if the curling is corrected in this fashion, the first and second magnetic layers are made different from each other in magnetic properties such as a recording density and coercive force, making it necessary to distinguish the first and second layers by some means. When it comes to a thin film type recording medium of a certain kind or to a coating type magnetic recording medium in which magnetic layers are formed on both surfaces of the substrate under the same conditions and, thus, have exactly the same properties, the first and second magnetic layers need not be distinguished. However, where the first and second magnetic layers formed on both surfaces of the substrate differ from each other in magnetic properties, it is necessary to use only the magnetic layer having satisfactory properties as the recording layer. Alternatively, the recording-reproduction must be performed under the conditions adjusted to meet the magnetic properties of the magnetic layer. It follows that it is necessary to distinguish the front and back sides of the recording medium and to load the recording medium in a package, with the recording medium and the package aligned with respect to the directivity.

However, the front and back surfaces of the magnetic recording medium produced as above seemingly exhibit the same metal luster, making it impossible to visually distinguish the front and back surfaces. Thus, it was customary to apply total inspection to the recording medium before loading in a package in order to avoid confusion in the loading step with respect to the front and back sides of the recording medium. What should be noted is that the total inspection requires much time and labor in the manufacturing process of the magnetic recording medium, leading to a low productivity of the recording medium.

SUMMARY OF THE INVENTION

An object of this invention is to provide an information recording disk provided with first and second recording layers of the same luster which can be visually distinguished easily.

The information recording disk of this invention, which comprises a disk-like substrate and recording layers formed on both surfaces of the substrate, is punched with marks distinguishing the front and back sides of the recording disk to make the front surface of the recording disk different from the back surface in the planar shape. The mark is provided by, for example, at least one hole made in the recording disk. The hole, i.e., a distinguishing hole, is positioned outside a reference line passing through both the center of the central hole and the center of an index hole made in the disk for monitoring the rotating state of the disk in the recording-reproducing step. If the disk is rotated by 180° about the reference line, the position of the distinguishing hole is reversed with respect to the reference line because the reference line does not pass through the distinguishing hole, making it possible to visually distinguish the front and back surfaces of the disk. Alternatively, two distinguishing holes differing from each other in size or distance from the reference line may be formed in the disk. Further, the outer periphery of the disk or the wall of the central hole may be provided with a recess as the distinguishing mark.

Since a distinguishing mark is punched though the information recording disk, the front and back surfaces of the disk are made different from each other in the planar shape, making it possible to visually distinguish the front and back surfaces of the disk. Naturally, the recording disk can be readily loaded in a package without fail, making it possible to eliminate the total inspection applied in the past before the loading step and, thus, to increase the productivity of the disk. What should also be noted is that the distinguishing mark is provided by a hole punched through the disk. It follows that the mark can be formed in punching step for forming the recording disk, with the result that no confusion is brought about in the later steps.

DETAILED DESCRIPTION OF THE PREFERRED EMBODIMENTS

Figure 1A:
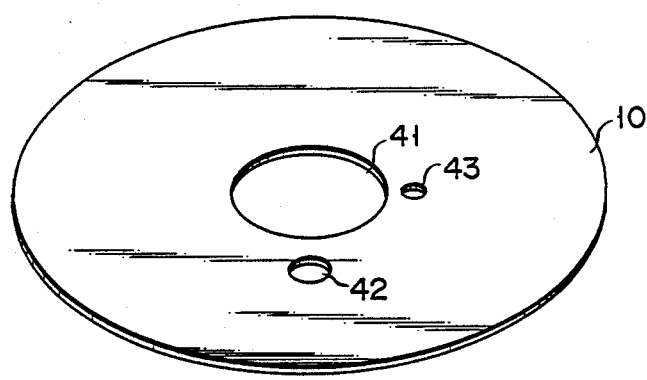
FIG. 1A is an oblique view showing magnetic disk according to embodiment of this invention.
Figure 1B:
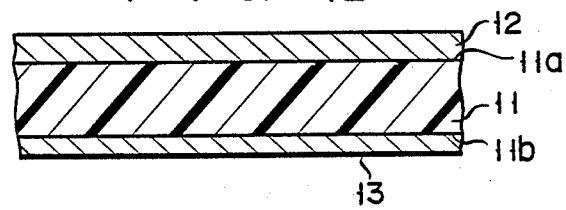
FIG. 1B is a cross sectional view showing in a magnified fashion the magnetic disk shown in FIG. 1A.

FIGS. 1A to 1D collectively show a magnetic disk 10 according to the typical embodiment of this invention. As seen from FIG. 1B, the magnetic disk 10 comprises a disk-shaped substrate 11 formed of a polymer such as polyimide or polyester, a first magnetic layer 12 formed on the front surface 11a of the substrate 11, and a second magnetic layer 13 formed on the back surface 11b of the substrate 11. The first and second magnetic layers 12, 13, which consist of Co-Cr series thin films, are sequentially formed by means of, for example, sputtering using a sequential thin film-forming apparatus. Specifically, the first layer 12 is formed first and, then, the second layer 13 is formed.

Figure 2:
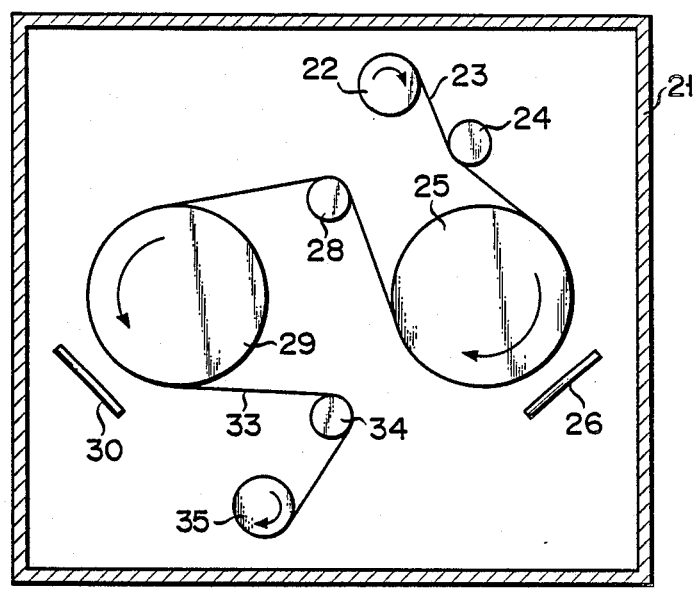
FIG. 2 shows the apparatus for producing the magnetic disk shown in FIG. 1A.
Figure 3A:
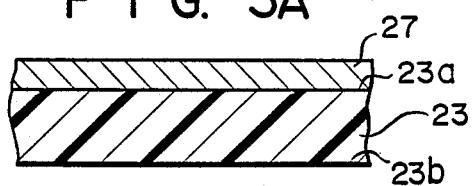
FIGS. 3A and 3B are cross sectional views collectively showing the process for producing the magnetic disk shown in FIG. 1A.
Figure 3B:
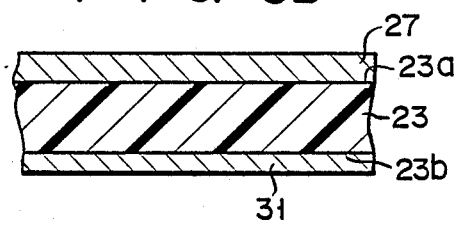

FIG. 2 shows the sequential thin film-forming apparatus mentioned above. A thin film is continuously formed in a vacuum vessel 21 shown in FIG. 2. It is seen that a polymer tape substrate 23 wound about a supply roll 22 is continuously released from the roll 22 so as to be wound about a main roll 25. An auxiliary roll 24 is provided, as required, between the supply roll 22 and the main roll 25. A sputtering target 26 formed of a Co-Cr alloy containing 22% b weight of Cr is disposed to face the main roll 25. The film-forming material is supplied from the target 26 to the substrate 23, with the result that a first magnetic layer 27 is formed on a surface 23a of the substrate 23 as shown in FIG. 3A. Then, the substrate 23 is guided via an auxiliary roll 28 onto another main roll 29. While passing along the surface of the main roll 29, a film-forming material is supplied from another sputtering target 30 disposed to face the main roll 29 onto the other surface 23b of the substrate 23 to form a second magnetic layer 31 as shown in FIG. 3B. The sputtering targets 26 and 30 are substantially equal to each other in the component. The resultant tape 33 is taken up via an auxiliary roll 34 by a take-up roll 35.

To prevent the substrate 23 from being curled, the first and second magnetic layers 27 and 31 are made different from each other in thickness, composition or other film-forming conditions. For example, the first layer 27 is 0.5-1.0 mm thick, and the second layer 31 is thicker by 20-10% than the first layer 27. As a result, the first and second magnetic layers 27, 31 exhibit different magnetic properties such as recording density and coercive force. However, it is difficult to distinguish these magnetic layers from the surface luster.

Figure 1C:
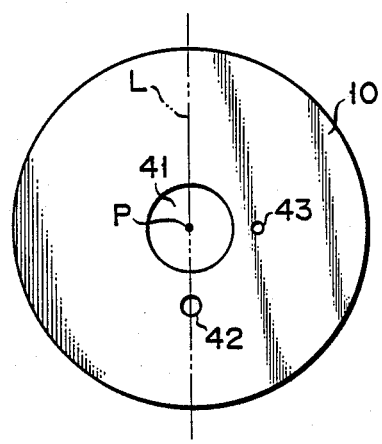
FIG. 1C is a plan view showing the front surface of the magnetic disk shown in FIG. 1A.

In the present invention, the magnetic disk 10 is provided with a distinguishing hole for visually distinguishing the front and back surfaces of the disk without difficulty. Specifically, the magnetic disk 10 is produced by shaping the tape 33 into a disk having a diameter of, for example, 88.0 mm by means of punching, as shown in FIG. 1C. The disk 10 is provided with a central hole 41 having a diameter of, for example, 8 mm and an index hole 42 for monitoring the rotating state of the disk 10 in the recording-reproducing step which is carried out with the disk 10 loaded in a package. The index hole 42 is provided near the central hole 41 and outside the magnetic recording region. It is important to note that the magnetic disk 10 is also provided with a hole 43 for distinguishing the front and back surfaces of the disk 10. The hole 43 is positioned outside a reference line L passing through both the center P of the disk 10 and the center of the index hole 42 and closer to the central hole 41 than the index hole 42. These holes 41, 42, 43 are formed in the step of punching the tape 33 into a disk shape.

Figure 1D:
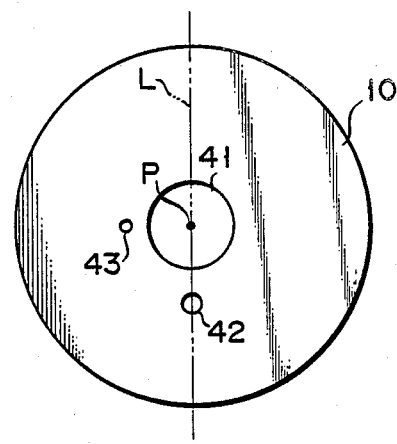
FIG. 1D is a plan view showing the back surface of the magnetic disk shown in FIG. 1A.

FIG. 1D shows the back surface of the resultant magnetic disk 10. As apparent from the drawing, the surface of FIG. 1D is equal to that obtained by rotating the front surface of the disk 10 shown in FIG. 1C by 180° about the reference line L. What should be noted is that the position of the distinguishing hole 43 is reversed by the rotation with respect to the reference line L. It follows that it is possible to distinguish the front and back surfaces of the disk 10 by observing the position of the distinguishing hole 43. Naturally, the magnetic disk 10 can be loaded in a package (not shown) as desired.

Figure 4:
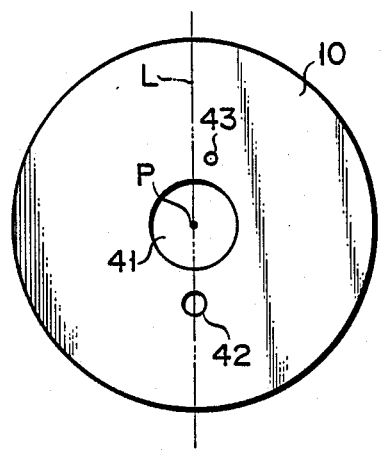
FIG. 4 is a plan view showing the front surface of a magnetic disk according to a second embodiment of this invention.

The present invention can be modified in various fashions. For example, the distinguishing hole 43 can be positioned closer to the reference line L, as shown in FIG. 4.

Figure 5:
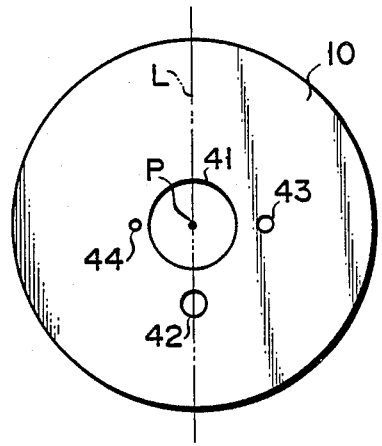
FIG. 5 is a plan view showing the back surface of the magnetic disk according to the second embodiment of this invention.

FIG. 5 shows that distinguishing holes 43 and 44 are provided on a line passing through the center P of the disk 10 and perpendicular to the reference line L. These holes 43 and 44 differ from each other in the distance from the center P and in the diameter. If the disk 10 is rotated by 180° about the reference line L, the positions of the holes 43 and 44 are reversed, quite naturally, making it possible to distinguish the front and back sides of the disk 10.

Figure 6:
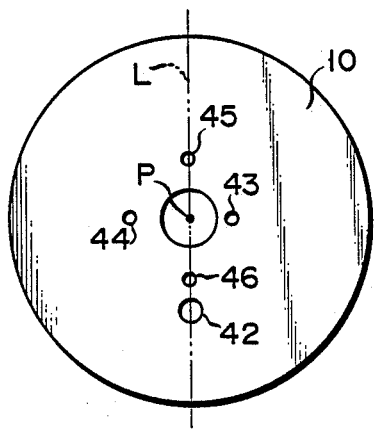
FIG. 6 is a plan view showing the front surface of a magnetic disk according to a third embodiment of this invention.
Figure 7:
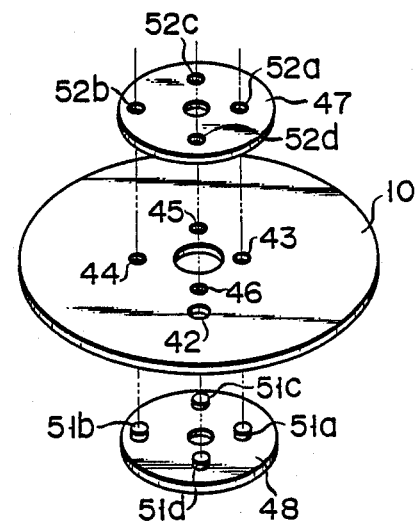
FIG. 7 is an the magnetic disk shown in FIG. 6 and a hub for fixing the disk.

FIG. 6 shows that four distinguishing holes 43-46 having the same diameter are formed in the disk 10. The holes 43 and 44 are positioned on a line passing through the center P of the disk 10 and perpendicular to the reference line L. Also, these holes 43 and 44 differ from each other in the distance from the center P. The other holes 45 and 46 are positioned on the reference line L. This embodiment is significant where hubs 47 and 48, which are used for fixing the disk 10 to a suitable apparatus (not shown), are mounted to the central portion of the disk 10 to have the disk 10 sandwiched therebetween, as seen from FIG. 7. Specifically, the distinguishing holes 43-46 of the disk 10 are engaged with projections 51a–51d of the hub 48. These projections are further engaged with holes 52a–52d of the hub 47 disposed on the other side of the disk 10. Because of the engagement, the disk 10 is prevented from being deviated in its rotating direction from the hubs 47, 48. Further, the holes 43–46 can also be used as marks for classifying the information recording disks depending on the characteristics thereof.

Figure 8:
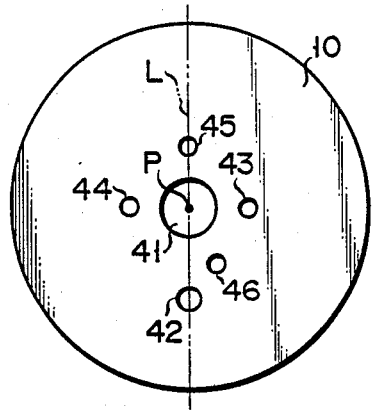
FIGS. 8-33 are plan views each showing the planar shape of a magnetic disk according to another embodiment of this invention.

FIG. 8 shows another embodiment. In this embodiment, the disk 10 is also provided with four holes 43–46 as in the embodiment of FIG. 6. It is seen from FIG. 8 that the holes 43 and 44 are symmetrically positioned with respect to the reference line L. The hole 45 is positioned on the reference line L. Further, the hole 46 is positioned slightly apart from the reference line L. In this embodiment, the hole 46 acts as the distinguishing hole because the position of the hole 46 is reversed with respect to the reference line L if the disk 10 is rotated by 180° about the reference line L, quite naturally. It should be noted that the distances between the holes are greater in FIG. 8 than in FIG. 6. Thus, the mold used in the punching step can be prevented from becoming locally thin in the embodiment of FIG. 8, leading to an improved durability of the mold.

Figure 9:
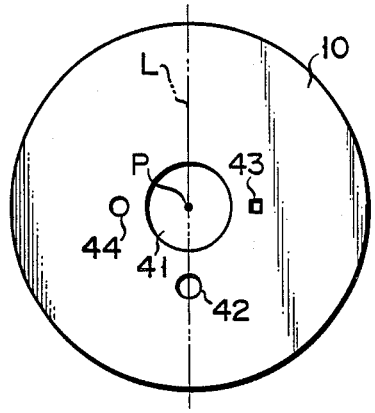
Figure 10:
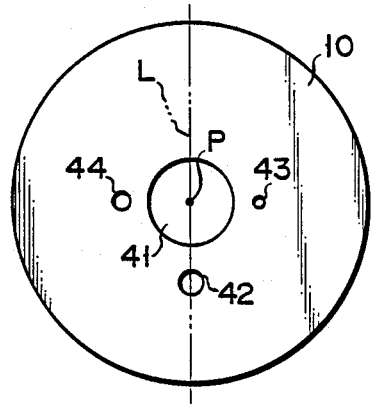
Figure 11:
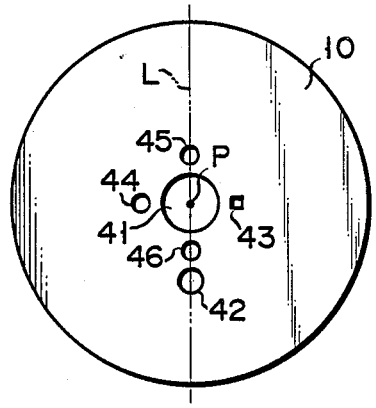
Figure 12:
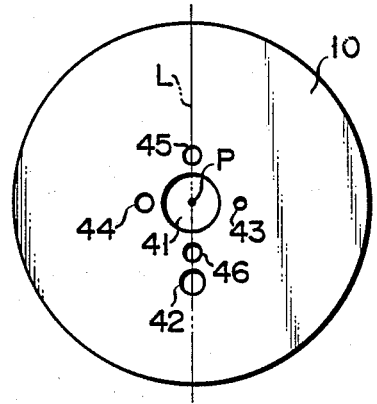
Figure 13:
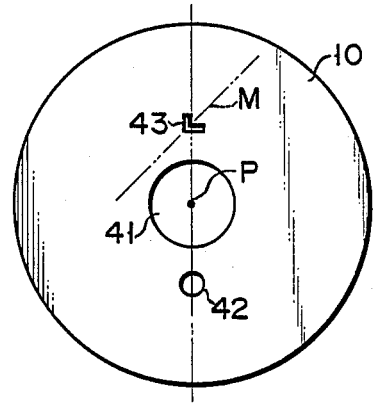
Figure 14:
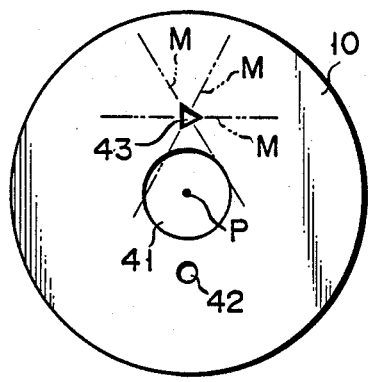
Figure 15:
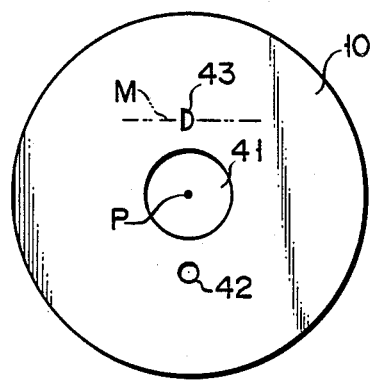
Figure 16:
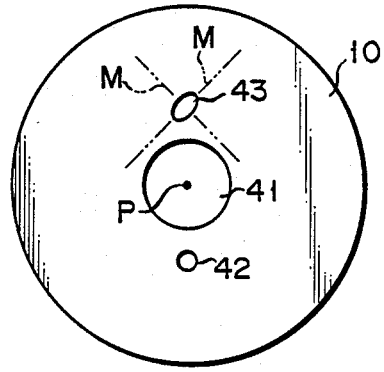
Figure 17:
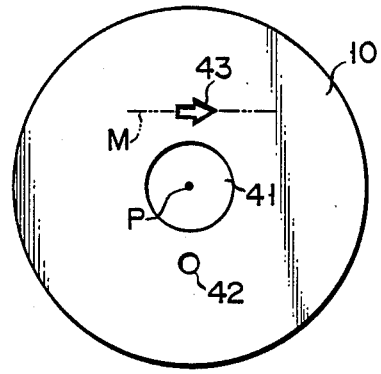

In each of the embodiments of FIG. 6 and FIG. 8 described above, the distinguishing holes provided on both sides of the reference line L are made asymmetrical with respect to the reference line L. On the other hand, FIGS. 9–12 show additional embodiments of a different type. Specifically, FIG. 9 shows that the distinguishing holes 43 and 44 positioned on both sides of the reference line L differ from each other in shape. In the embodiment of FIG. 10, the distinguishing holes 43 and 44 differ from each other in size. Additional holes 45 and 46 positioned on the reference line L may be formed in the disk 10 as shown in FIGS. 11 and 12. As apparent from the drawings, the front and back sides of the disk 10 can be distinguished if the disk 10 is rotated by 180° about the reference line L in the embodiments of FIGS. 9–12.

FIGS. 13–17 show additional embodiments in which the distinguishing hole 43 is positioned on the reference line L. In these embodiments, the hole 43 is shaped symmetrical with respect to a line M not passing through the center P of the disk 10. In other words, the distinguishing hole 43 is made asymmetrical with respect to a line passing through both the center P of the disk 10 and the center of the hole 43. As seen from the drawings, the hole 43 is L-shaped in FIG. 13, triangular in FIG. 14, semi-circular in FIG. 15, elliptical in FIG. 16, and arrow-shaped in FIG. 17. Of course, the front and back sides of the disk 10 can be distinguished, if the disk 10 is rotated by 180° in these embodiments. To achieve smooth rotation of the disk, it is desirable for the hole 43 to be shaped elliptical or semi-circular. It should also be noted that the front and back surfaces of the disk can be distinguished in these embodiments even if the index hole 42 is not formed in the disk 10, making it possible to decrease the number of holes made in the disk.

Figure 18:
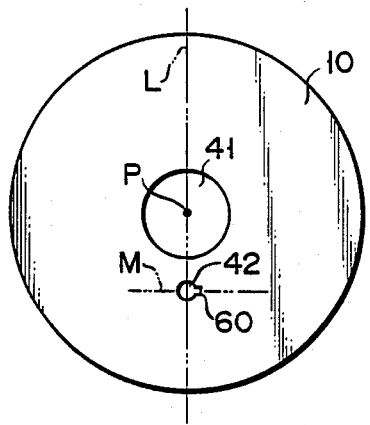
Figure 19:
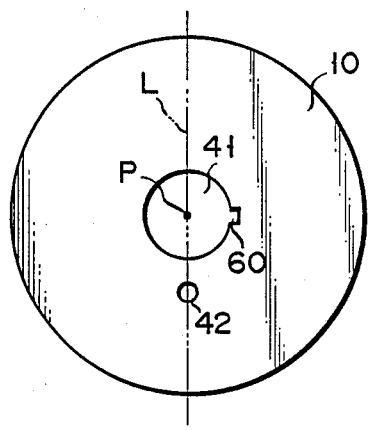

FIGS. 18 and 19 show additional embodiments of the present invention. Specifically, a recess is formed in the wall of the disk defining the index hole 42 in FIG. 18 and in the wall of the disk defining the central hole 41 of the disk in FIG. 19. What should be noted is that the recess mentioned above is not positioned on the reference line L, making it possible to distinguish the front and back surfaces of the disk by rotating the disk by 180° about the reference line L. These embodiments are advantageous in that the distinction can be achieved by simply applying a slight modification to the conventional information recording disk.

Figure 20:
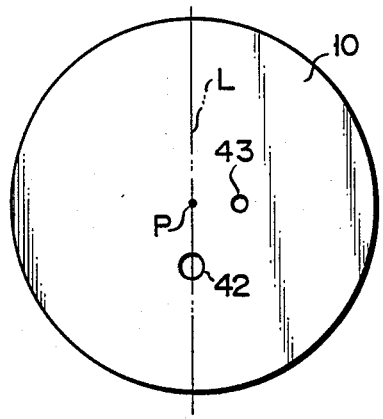
Figure 21:
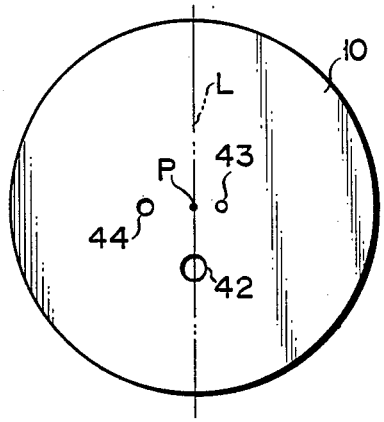
Figure 22:
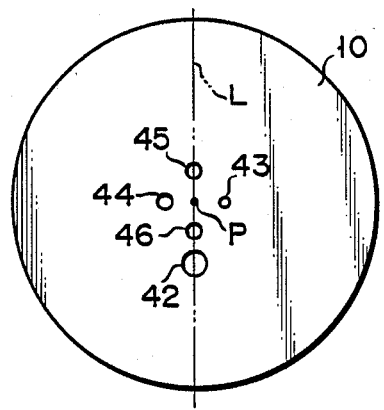
Figure 23:
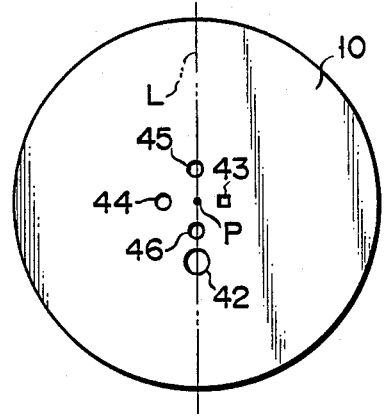
Figure 24:
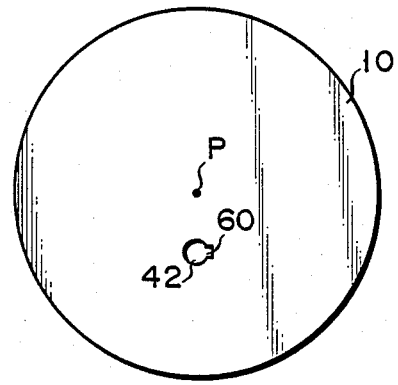
Figure 25:
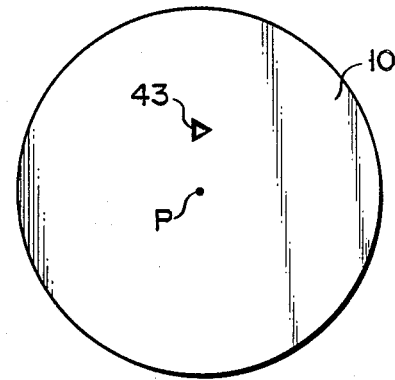
Figure 26:
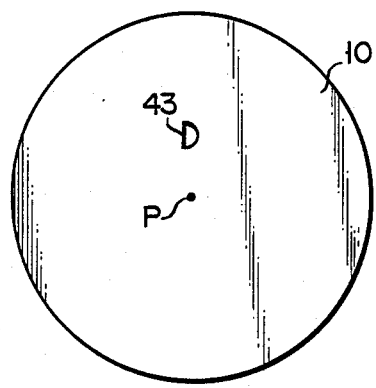

In the embodiments described above, the disk 10 is provided with the central hole 41. However, the present invention can also be applied to the disk which is not provided with the central hole, as apparent from FIGS. 20–26. Specifically, FIG. 20 shows that the disk 10 is provided with only one distinguishing hole 43 which is not positioned on the reference line L. In FIG. 21, the distinguishing holes 43 and 44 differing from each other in the distance from the center of the disk and in size are formed on both sides of the reference line L. In FIG. 22, the disk 10 is further provided with two additional holes 45 and 46 positioned on the reference line L. In FIG. 23, the distinguishing hole 43 is shaped rectangular. Further, FIGS. 24, 25, 26 are substantially equal to FIGS. 18, 14, 15, respectively, except that the disk 10 is not provided with the central hole 41 in FIGS. 24–26. In these embodiments, the distinguishing holes can be provided near the center of the disk 10 because the disk is not provided with the central hole, leading to an increased effective area of the disk 10. It should also be noted that the distinction in question can be achieved even if the disk is provided with only one distinguishing hole as far as the hole is not positioned on the center of the disk, as apparent from FIGS. 24–26. Of course, the front and back surfaces of the disk 10 can be distinguished, if the disk 10 is rotated by 180° about the reference line L in the embodiments of FIGS. 20–26.

Figure 27:
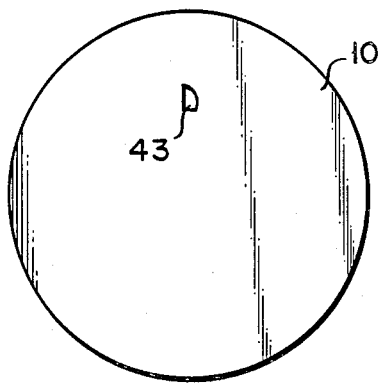
Figure 28:
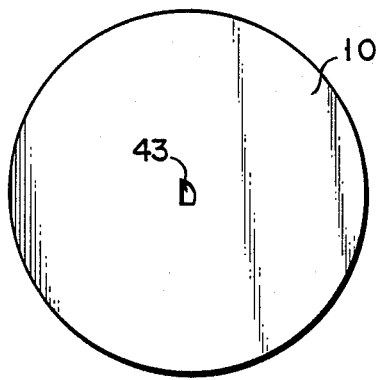
Figure 29:
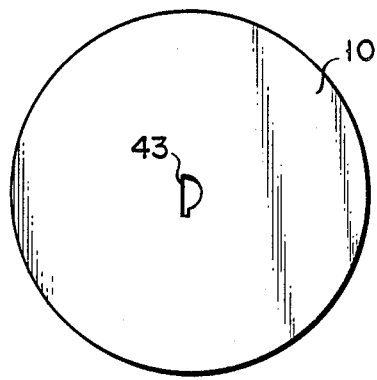
Figure 30:
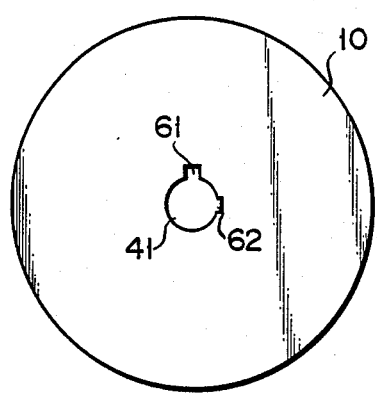

FIGS. 27–30 show additional embodiments in which the disk 10 is provided with only one hole. In FIG. 27, the disk 10 is provided with a deformed semi-circular hole 43 positioned apart from the center of the disk. In FIG. 28, the deformed semi-circular hole 43 is positioned in the center of the disk. In FIG. 29, the disk is provided with a recess (i.e., a cut-out) communicating with the semi-circular hole 43 positioned in the center. Further, FIG. 30 shows that the disk 10 is provided with two recesses 61 and 62 differing from each other in depth. Also, the line passing through both the recess 61 and the center of the disk makes an angle of 90° with the line passing through both the recess 62 and the center of the disk. As seen from the drawing, these recesses are positioned in the central portion to communicate with the central hole 41 of the disk 10. In these embodiments, the front and back sides of the disk 10 can be distinguished easily, if the disk 10 is simply turned upside down. Also, the effective area of the disk 10 can be further increased.

Figure 31:
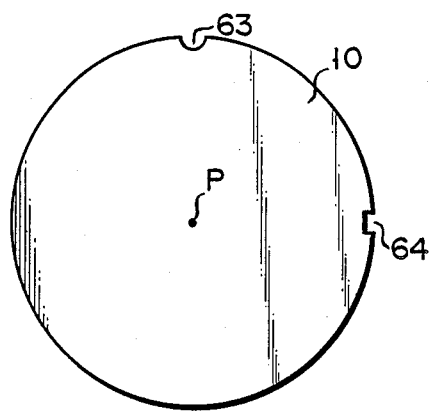
Figure 32:
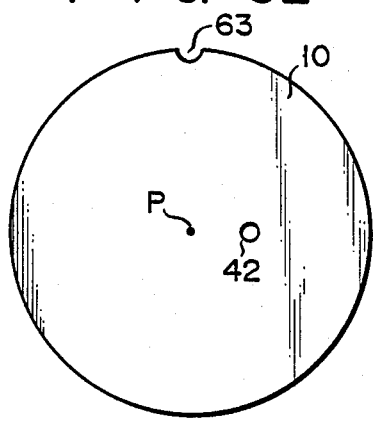
Figure 33:
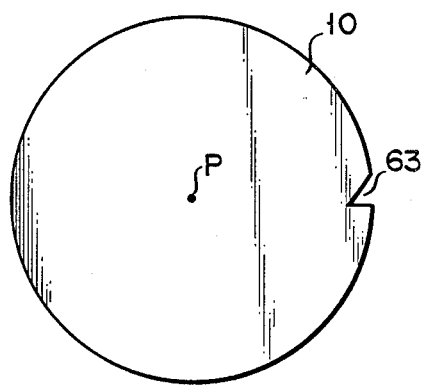

FIGS. 31 to 33 show still additional embodiments. Specifically, FIG. 31 shows that the outer periphery of the disk 10 is provided with two recesses 63 and 64 differing from each other in shape. Also, the line passing through both the recess 63 and the center of the disk makes an angle of 90° with the line passing through both the recess 64 and the center of the disk. On the other hand, the outer periphery of the disk 10 is provided with only recess 63 in the embodiment of FIG. 32. In this case, recess 63 is not positioned on the line passing through both the center of the index hole 42 and the center P of the disk 10. In these embodiments, the position of the recess 64 or the index hole 42 is reversed with respect to the reference line passing through both the center P of the disk and the recess 63, if the disk 10 is rotated by 180° about the reference line, making it possible to distinguish the front and back sides of the disk 10. Further, FIG. 33 shows that the outer periphery of the disk 10 is provided with the recess 63 of a triangular shape. Of course, the front and back sides of the disk 10 can be easily distinguished in this embodiment, if the disk 10 is turned upside down.

As described above in detail, the information recording disk of the present invention is provided with a hole or recess serving as a mark for distinguishing the front and back surfaces of the disk when the disk is turned upside down.

The technical idea of the present invention can also be applied to an optical disk, optical magnetic disk, and an information recording disk utilizing an electrostatic capacitance, etc.

What is claimed is:

1. An information recording disk comprising:
a disk-like substrate formed of polymer and having first and second surfaces; and
first and second layers formed of magnetic material and having the same luster but with different physical properties, said first and second layers being formed on the first and second surfaces of the substrate, respectively, and provided with a first through hole punched through the substrate and the first and second layers, and at least a second through hole punched through the substrate and the first and second layers, said first and second through holes located at locations other than at the center of the substrate, said second through hole positioned apart from a reference line passing through both the center of the first through hole and the center of the disk, said first through hole and said second through hole being asymmetric with respect to a diametrical center line of the disk so that the first and second surfaces are distinguishable from each other.

2. The information recording disk according to claim 1, wherein the disk is further provided with a third through hole positioned on the opposite side of the second through hole with respect to the reference line, said third through hole differing from the second through hole in at least one of the size, shape and distance from the reference line.

3. The information recording disk according to claim 1, wherein the just through hole is an index hole for detecting the rotating state of the disk.

4. The information recording disk according to claim 1, wherein the second through hole is a cut-out formed at the outer periphery of the disk.

5. The information recording disk according to claim 1, wherein the disk further comprises a hole made through the center of the disk for determining the center of the disk.

6. An information recording disk according to claim 1, wherein said first and second layers are formed of Co-Cr series material.

7. An information recording disk according to claim 1, wherein said first and second layers are made different from each other in thickness.

8. An information recording disk comprising:
a disk-like substrate formed of polymer and having first and second surfaces; and
first and second layers formed of magnetic material and having the same luster but with different physical properties, said first and second layers being formed on the first and second surfaces of the substrate, respectively, and provided with at least one mark consisting of one or more through holes or cut-outs punched through the substrate and the first and second layers, said one or more through holes or cut-outs being shaped in an asymmetrical fashion with respect to a reference line passing through the center of the disk so that the first and second layers are thereby distinguishable from each other.

9. The information recording disk according to claim 8, wherein the information recording disk is a magnetic recording disk.

10. The information recording disk according to claim 8, wherein the mark is provided outside the recording region of the disk.

11. The information recording disk according to claim 8, wherein at least one through hole is a hole made in the central region of the disk.

12. The information recording disk according to claim 8, wherein the through hole is an index hole for monitoring the rotating state of the disk.

13. The information recording disk according to claim 8, wherein the mark is a cut-out made at the outer periphery of the disk.

14. The information recording disk according to claim 8, wherein the mark consists of a first recess made at the outer periphery of the disk and a second recess positioned apart from a line passing through both the center of the first recess and the center of the disk and differing in shape from the first recess.

15. The information recording disk according to claim 8, wherein the mark includes a hole in the disk and a notch extending from the hole.

16. An information recording disk according to claim 8, wherein said first and second layers are formed of Co-Cr series material.

17. An information recording disk according to claim 8, wherein said first and second layers are made different from each other in thickness.

18. An information recording disk comprising:
a disk-like substrate formed of polymer and having first and second surfaces; and
first and second layers formed of magnetic material and having the same luster but with different physical properties, said first and second layers being formed on the first and second surfaces of the substrate, respectively, and provided with at least one mark consisting of one or more through holes or cut-outs punched through the substrate and the first and second layers, said one or more through holes or cut-outs being positioned in an asymmetrical fashion with respect to a reference line passing through the center of the disk so that the first and second layers are thereby distinguishable from each other.

19. An information recording disk according to claim 18, wherein said first and second layers are formed of Co-Cr series material.

20. An information recording disk according to claim 18, wherein said first and second layers are made different from each other in thickness.

* * * * *